US011151450B2

(12) United States Patent
Zoldi et al.

(10) Patent No.: US 11,151,450 B2
(45) Date of Patent: Oct. 19, 2021

(54) SYSTEM AND METHOD FOR GENERATING EXPLAINABLE LATENT FEATURES OF MACHINE LEARNING MODELS

(71) Applicant: FAIR ISAAC CORPORATION, Roseville, MN (US)

(72) Inventors: Scott Michael Zoldi, San Diego, CA (US); Shafi Rahman, San Diego, CA (US)

(73) Assignee: FAIR ISAAC CORPORATION, Roseville, MN (US)

( * ) Notice: Subject to any disclaimer, the term of this patent is extended or adjusted under 35 U.S.C. 154(b) by 747 days.

(21) Appl. No.: 15/985,130

(22) Filed: May 21, 2018

(65) Prior Publication Data
US 2019/0354853 A1    Nov. 21, 2019

(51) Int. Cl.
*G06N 3/04* (2006.01)
*G06N 3/08* (2006.01)
*G06N 20/00* (2019.01)

(52) U.S. Cl.
CPC ........... *G06N 3/08* (2013.01); *G06N 3/04* (2013.01); *G06N 3/0454* (2013.01); *G06N 3/082* (2013.01); *G06N 20/00* (2019.01)

(58) Field of Classification Search
CPC .......... G06N 3/082; G06N 3/08; G06N 20/00; G06N 3/04; G06N 3/0454; G06N 5/045; G06N 3/0481; G06N 3/063
See application file for complete search history.

(56) References Cited

U.S. PATENT DOCUMENTS

| 2018/0032866 A1* | 2/2018 | Son ........................ G06N 3/04 |
| 2019/0279111 A1* | 9/2019 | Merrill .................... B60Q 9/00 |
| 2020/0285939 A1* | 9/2020 | Baker ...................... G06N 3/04 |

FOREIGN PATENT DOCUMENTS

WO    WO-2018/058509 A1    4/2018

OTHER PUBLICATIONS

Martens, D. et al. (Jul. 10, 2007, e-published Jan. 29, 2007) "Comprehensible credit scoring models using rule extraction from support vector machines," European Journal of Operational Research, vol. 183, No. 3, pp. 1466-1476.
West, David. (Sep. 12, 2000) "Neural Network Credit Scoring Models," Computers & Operations Research, 27:1131-1152. Web. Oct. 11, 2019.

\* cited by examiner

*Primary Examiner* — Hal Schnee
(74) *Attorney, Agent, or Firm* — Mintz Levin Cohn Ferris Glovsky and Popeo, P.C.

(57) ABSTRACT

Systems and methods that use a neural network architecture for extracting interpretable relationships among predictive input variables. This leads to neural network models that are interpretable and explainable. More importantly, these systems and methods lead to discovering new interpretable variables that are functions of predictive input variables, which in turn can be extracted as new features and utilized in other types of interpretable models, like scorecards (fraud score, etc.), but with higher predictive power than conventional systems and methods.

15 Claims, 11 Drawing Sheets

$$h_1 = \sigma(w_{21}v_2 + w_{01})$$
$$h_2 = \sigma(w_{12}v_1 + w_{52}v_5 + w_{02})$$
$$h_{31} = \sigma(w_{231}v_2 + w_{431}v_4 + w_{031})$$
$$h_{321} = \sigma(w_{2321}v_2 + w_{3321}v_3 + w_{0321})$$
$$h_{322} = \sigma(w_{6322}v_6 + w_{0322})$$

where,
$$\sigma(x) = \frac{1}{1+e^{-x}}$$

FIG 8 record i    record j

FIG 10

Segment 1  Segment 2

SYSTEM AND METHOD FOR GENERATING EXPLAINABLE LATENT FEATURES OF MACHINE LEARNING MODELS

TECHNICAL FIELD

The subject matter described herein relates to machine learning, and more particularly to systems and methods for explaining latent features of machine learning models.

BACKGROUND

Machine learning (ML) technologies are becoming increasingly used in a variety of business decisions. Many of these machine learning technologies are "black box" in nature, meaning their computer-generated output is not explainable to a human, particularly in view of various business regulations imposed on such output. Due to explainability constraints, many of which arise out of business regulations, machine learning models are often not ideal for business usage without modification. Therefore, often interpretable models are used in business decisions that require explainability.

Many machine learning models can provide prediction accuracy that surpasses the predictive power of the interpretable models. This improvement in machine learning models is attributed to the complex relationships that these models can learn among the many often co-linear predictive input variables. While many machine learning models are not amenable to explaining the complex relationships among the predictive input variables, neural networks often have an architecture that shows promise to provide enlightenment to the data scientist and explainability of the complex relationships learned by machine learning models that drives prediction.

SUMMARY

This document presents a systems and methods that use a neural network architecture for extracting interpretable relationships among predictive input variables. This leads to neural network models that are interpretable and explainable. More importantly, these systems and methods lead to discovering new interpretable variables that are functions of predictive input variables, which in turn can be extracted as new features and utilized in other types of interpretable models, like scorecards (fraud score, FICO® score, etc.), but with higher predictive power than conventional systems and methods.

In some aspects, the methodology and toolkit enable training of a neural network that has an interpretable architecture. The interpretable neural network includes an input layer, and each of the hidden nodes connected to the input layer can be interpreted, by a domain expert or artificial intelligence system, to signify a non-linear transformation of weighted sums of up to N input variables, where N is defined to be an interpretability threshold. This threshold is often set to 2, due to an ordinary human's inability to visualize more than two dimensions effectively.

With this methodology, it is possible to directly translate a fully connected neural network model into a simplified neural network with interpretable architecture. Using a reference neural network, sub-populations can be identified that may form separate segments in a latent space, and separate simplified neural networks can be trained for these segments to retain predictive power. Explainable latent features can be extracted, and incorporated in interpretable models leading to improvement in their predictive power. This approach of extracting simplified latent features has immense value in applications such as credit risk scoring, where laws or regulations require that the model's architecture and input variables be completely interpretable.

In some aspects, a system and a method, executed by one or more computer processors, of extracting explainable latent features from a machine learning model using a training dataset are presented. The machine learning model includes one or more predictive input variables, each of the one or more predictive input variables having a weight in the machine learning model. The method includes training a fully connected neural network model with the one or more predictive input variables using a training data set, the neural network model having an input layer, an output layer, and one or more hidden layers each comprising one or more hidden nodes, each hidden node having one or more inputs and at least one output, and applying regularization to the cost function of the neural network model such that weights of one or more edges connecting the predictive input variables to the hidden nodes converge towards zero.

The method further includes extracting from the neural network model any hidden node that has up to N non-zero inputs, where N is a threshold for human explanation of the relationship between the N non-zero inputs to the hidden node. The method further includes, for hidden nodes with greater than N non-zero inputs, generating a separate neural network to model each node's activation from the trained neural network model response on the training dataset to expose the explainable latent features of the hidden nodes via new hidden nodes of less complexity of the separate neural network. The resulting neural network with all hidden nodes at complexity of N non-zero inputs or less yields an explainable latent feature neural network.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 8 illustrates a representation of interpretable latent features based on the example in FIG. 7;

FIG. 10 shows an activation matrix corresponding to processing p records through the reference neural network model with J hidden nodes;

When practical, similar reference numbers denote similar structures, features, or elements.

DETAILED DESCRIPTION

Figure 1:
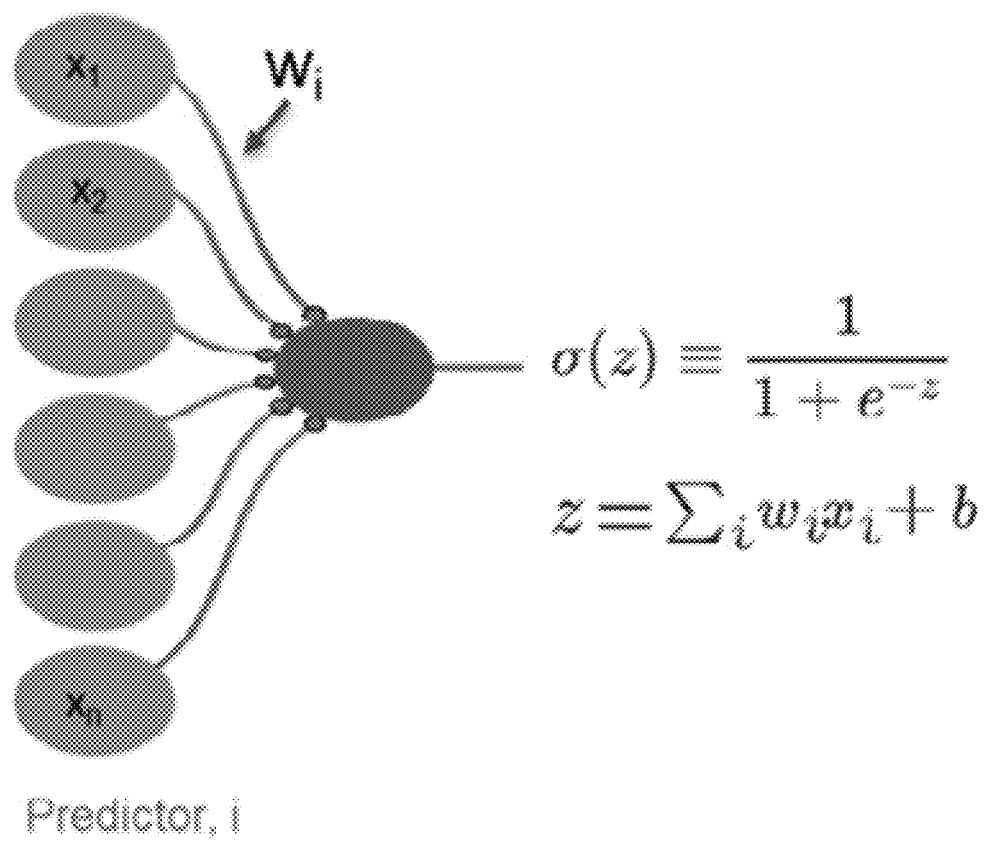
FIG. 1 shows a perceptron with n input variables, and a sigmoidal activation.

The basic computation unit of a neural network is a "perceptron." The perceptron takes a weighted sum of input variables and applies a non-linear transform. The non-linear transform can be a sigmoid activation function, or one of the many other non-linear transforms such as tanh, or a rectifier, etc. FIG. 1 shows a perceptron with n input variables, and a sigmoidal activation.

Figure 2:
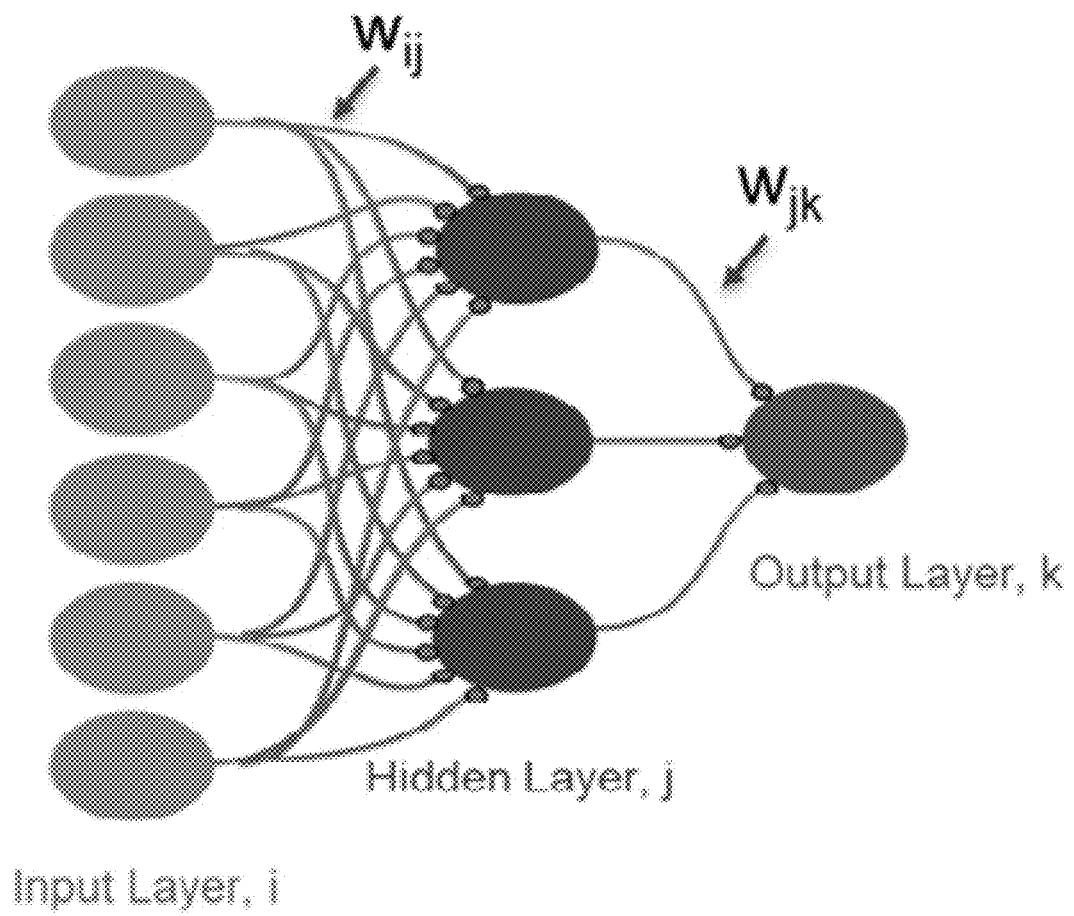
FIG. 2 shows a neural network model with one input layer with n input variable nodes, one output layer with 1 output node, and a single hidden layer with 3 hidden nodes.

A neural network model can be built by combining multiple perceptrons that utilize the same set of predictive variables as inputs and combining their outputs together using one or more perceptrons. FIG. 2 shows a basic neural network, which can have a single hidden layer. Such an architecture includes a fully connected neural network and is the simplest neural network model architecture possible. Neural network models can have multiple hidden layers, and such models have a single input layer with n input variables, and a single output layer with one or more outputs, along with multiple hidden layers. Each input variable, each perceptron in the hidden layers, and each output perceptron, are each called a "node." The connections between the nodes are called edges. Each edge has a weight. As shown in FIG. 2, $w_{ij}$ is the weight of the edge connecting the input node i to hidden node j. Similarly, $w_{jk}$ is the weight of the edge connecting the hidden node j to output node k. In this notation, $w_{0j}$ represents the bias term for the hidden node j and wok represents the bias term for the output node k. As per conventional notation, the bias terms are not shown in FIG. 2 but assumed to exist.

The hidden nodes are configured to learn complex interactions between all their inputs. These complex interactions are called latent factors and represent the underlying drivers of the relationships being modeled by the associated neural network model. Each node of the first hidden layer is configured to learn complex relationships among the input variables. These latent features are "black-box" in nature due to a non-linear transformation applied to a weighted combination of the input variables, where similar values of z depend on the phase space of possible combinations of input variables all equating to a similar z value. As shown in FIG. 1, z is the notation for representing activation of a node.

In some implementations, a system and method simplifies these latent features without sacrificing the predictive power of the model. Resultant models are far more interpretable than traditionally built neural network models and can be used where interpretability is a key requirement. More importantly, a generated set of simplified latent variables capture complex interactions between the input variables while being interpretable. The interpretable latent features learned in the process can be utilized as new predictive input variables for any model architecture, to increase a predictive power of such models.

Accordingly, in exemplary implementations, a system and method simplifies a neural network's architecture, and creates explainable latent features. The methodology described herein simplifies the interactions so that the learned latent factors are interpretable, so as to be possible to reduce hidden nodes to a function of a limited subset of predictive input variables, as opposed to the entire set of input variables, without perceptible loss in predictive power. As the number of input variables that are active (non-zero weight) into a hidden node reduces, a system and method makes it easier to understand and interpret the relationship between inputs expressed in that specific hidden node. Accordingly, restrictions are imposed on the number of input features used to define these latent features from an interpretability perspective, with a focus on a recursive reduction of hidden nodes (latent features) until an end state is reached for the following types of latent features: 1) a non-linear transform of a single input variable; 2) a non-linear transform of a weighted sum of two input variables; and 3) a non-linear transform of a weighted sum of up to N variables, where N is an interpretability threshold. N can be set to a large value if needed, though N is usually set to 2 from an interpretability perspective in most implementations. In some preferred exemplary implementations, N=2, but larger values of N can also be used. In each non-linear transform, application of a bias term is implicit.

A method of extracting the explainable latent features from a given training dataset with associated target variable can include the following steps:

A) Train a fully connected neural network model using the dataset with the provided target variable. B) Simplify the hidden nodes by applying regularization such that most of the incoming weights converge to 0. Regularization is explained in the section titled "Simplifying the hidden nodes". C) Extract any hidden node that has up to N inputs only. From interpretability perspective, N is set to 2, meaning nodes of size 1 and 2 non-zero inputs are automatically extracted after regularization. D) For hidden nodes with more non-zero inputs than N (here 2), explode or create a separate neural network to model each's node activation from the model trained in either step A or step B. E) Repeat steps A-D for each of the exploded hidden nodes, until relationships are expressed in a much simpler set of relationships of 1 and 2 inputs to the resulting latent features.

By following the above steps, the model can be converted into a sparsely connected neural network model, and where latent features that cannot be automatically reduced to a simple feature relationship of one or two inputs are expanded into more latent features until relationships are resolved.

Training a Fully Connected Model

Training a fully connected neural network can include the following steps. Initially, the weights of the model are randomly set. Then a subset of records from the training dataset are scored with this model by applying the weights and the transformations node-by-node, and propagating the values through the layers. The output of the model is then compared with the associated target values from the training dataset. The deviations between predicted and actual values are then aggregated as a cost function, C. The cost function is dependent on the weights of the model, w, which consists of the weights of the edges as well as the bias terms, as described earlier. A number of objective functions can be used, and for the sake of explaining an exemplary implementation, a mean squared error (MSE) can be used, which takes the following shape:

$$C(w) = \frac{1}{2p} \sum_x \|y(x) - a(x)\|^2$$

where, y(x) is the actual target value for the record x, a(x) is the output of the neural network model for the record x, and p is the number of records in the training dataset.

Figure 3:
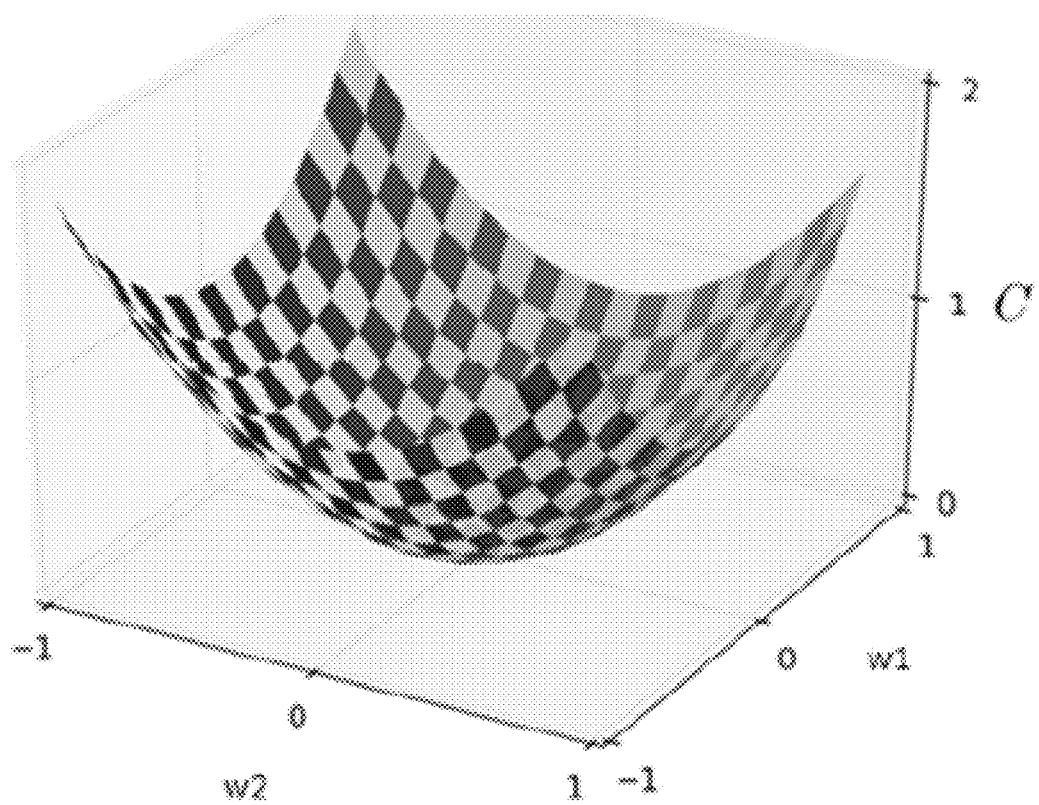
FIG. 3 is a schematic representation of an arbitrary cost function C, as a function of two weights, $w_1$ and $w_2$.

FIG. 3 shows a schematic representation of an arbitrary objective function C, as a function of two weights, $w_1$ and $w_2$. Any of a number of optimization algorithms can be used for minimizing the cost functions to identify the most optimal weights. In some implementations, a gradient descent method can be used. In this approach, the gradient vector of the curve described by the cost function is computed. The gradient vector corresponding to FIG. 3 is as follows:

$$\nabla C \equiv \left( \frac{\partial C}{\partial w_1}, \frac{\partial C}{\partial w_2} \right)^T.$$

The weights are then updated in the direction of the gradient using the following update rule:

$$w' = w - \eta \nabla C$$

where, η is learning rate. Often, the optimal value of η is learnt through an iterative selection process called parameter tuning. Note that w can be represented as either a weight vector or a weight matrix depending on the architecture of the model. A model converges to an optimal set of weights when the weights of the model yield the lowest possible value for the objective function, C.

Simplifying the Hidden Nodes

A fully connected neural network model has a large number of weights. For the fully connected model architecture shown in FIG. 2, the neural network model includes n number of input nodes, m number of hidden nodes in the single hidden layer and 1 output node. The number of weights in such a model is given by:

$$n_{weights} = n*m + m$$

The process for simplifying the model architecture includes forcing most of the hidden weights to converge to 0. By doing so, the fully connected model is converted into a sparsely connected neural network model, where many of the weights are near zero. The learning algorithm is changed to minimize the weights of most of the input variables in the hidden nodes. This can be achieved by adding a penalty term to the cost function. The modified cost function takes the following form, for example:

$$C = C_0 + \frac{\lambda}{p} \sum |w|$$

where, $C_0$ is the cost function introduced earlier, p is number of records used in the update iterations and λ is the regularization parameter that is used to control the quantum of penalization due to the sum of the absolute values of weights. Often, the optimal value of λ is learned through an iterative selection process called parameter tuning. This yields the following update rule to update the weights:

$$w' = w - \eta \nabla C - \frac{\eta \lambda}{p} \text{sgn}(w)$$

Note the additional term, as compared to the update rule described above. The update then is affected by the learning rate, η, and a modified gradient term as shown below after rearranging the terms:

$$w' = w - \eta \left( \nabla C - \frac{\eta \lambda}{p} \text{sgn}(w) \right)$$

where:

$$\text{sgn}(w) = \begin{cases} -1 & \text{if } w < 0 \\ 1 & \text{if } w > 0 \\ 0 & \text{if } w = 0 \end{cases}$$

As can be seen, the gradient is modified by a constant term which is negative for positive weights and positive for negative weights. Thus, this update rule shrinks the weights by a constant amount for all weights. If the weight is large, the proportional decrease is less and if the weight is small, the proportional decrease is large. As a result, the weights are concentrated in a relatively small number of high-importance connections, while the other weights converge toward zero.

Figure 4:
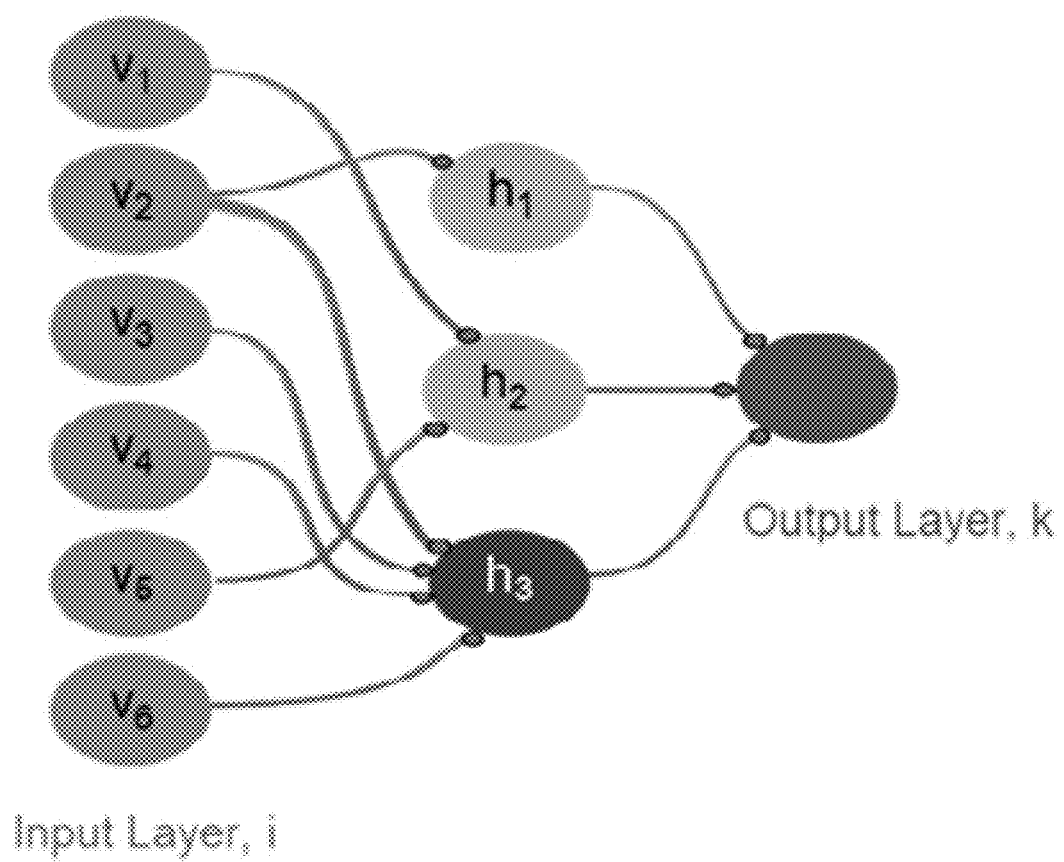
FIG. 4 is a schematic representation of the neural network model from FIG. 2 after adding a regularization penalty term.

FIG. 4 is a schematic representation of the neural network model from FIG. 2 after adding a regularization penalty term. One hidden node ($h_1$) has a single input variable, the second one ($h_2$) has two input variables, and the third one ($h_3$) has four input variables. The interpretable hidden nodes are shown in gray, with interpretability threshold, N=2 meaning they have no more than 1 or 2 non-zero weights of the inputs to the hidden node.

When this penalty term is applied to the cost function, some nodes with N (the interpretability threshold) or less significant non-zero weights remain, where N is the threshold number of input variables into a hidden node up till which the hidden node is considered interpretable. In most implementations, N=2 as hidden nodes with more than 2 input variables are often hard to interpret for a domain expert. Some hidden nodes still would have more inputs than interpretability threshold of N. As shown in FIG. 4, which shows a representation of a schematic scenario, after simplifying the model architecture by applying the penalty term, one hidden node has a single input variable, the second one has two input variables, and the third one has four input variables. Both the first and the second nodes are interpretable while the third hidden node is not yet interpretable, assuming the interpretability threshold N=2. Such a hidden node is defined to be a complex hidden node.

Figure 5:
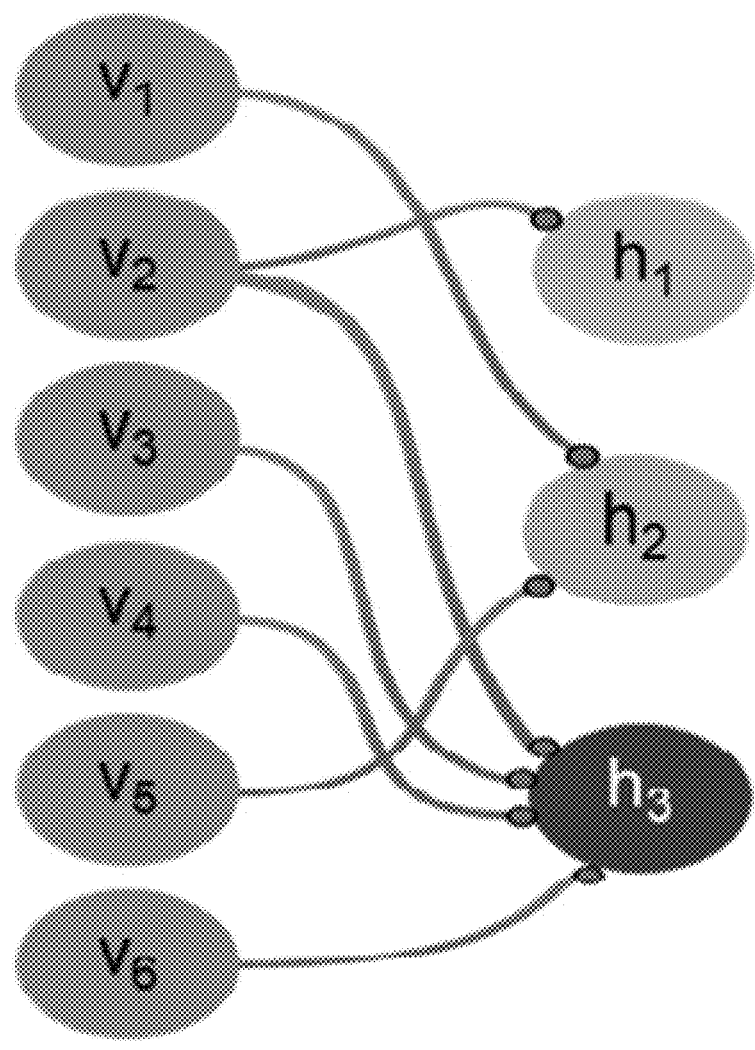
FIG. 5. is a schematic representation of a partial neural network model with the weights same as the weights between the input and hidden layer in the FIG. 4.

FIG. 5. is a schematic representation of a partial neural network model with the weights same as the weights between the input and hidden layer in the FIG. 4. The complex hidden nodes can be simplified through an iterative process. First, a partial neural network model is constructed with the weights same as the neural network model from the previous step. Then the training dataset is scored using this partial model. For example, the four inputs going into $h_3$, and the subsequent output value out of $h_3$ as a target can be recorded. This provides the activation of each of the hidden node. For generating activation values, it is possible to use either the fully connected neural network or the simplified neural network from the previous steps. Hereafter, the simplified neural network from previous step will be used, given the regularization down to the minimized set of inputs going into each hidden node from the regularization step. FIG. 5 shows the partial neural network corresponding to the example in FIG. 4, where $h_3$ is the latent feature that requires exploding to resolve the behaviors between the inputs $v_2$, $v_3$, $v_4$, and $v_6$.

Figure 6A:
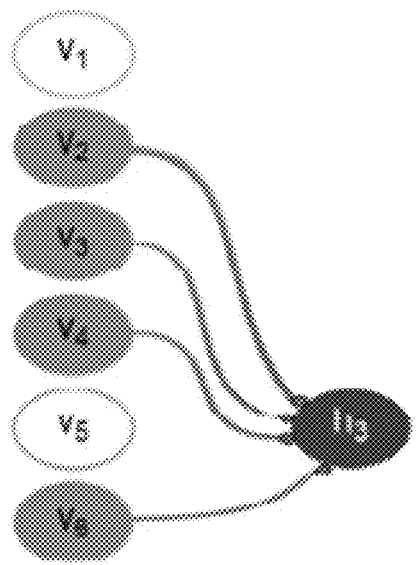
FIG. 6(a) shows the schematic representation of complex hidden node $h_3$ from FIG. 4 along with its input variables.
Figure 6B:
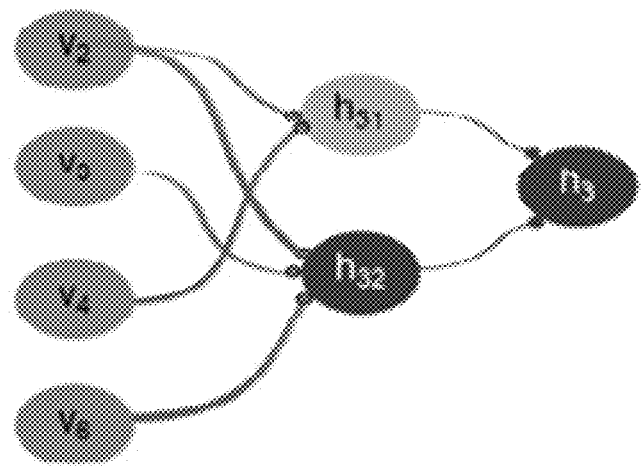
FIG. 6(b) shows the schematic representation of a regularized neural network representing this complex hidden node, $h_3$, from FIG. 6(a)

Once the activation values of the hidden nodes are available for the training dataset, a new neural network corresponding to each of the complex hidden nodes (inputs to the node greater than interpretability threshold, N) in the previous simplified neural network is trained. For a complex node, only its input variables are used as the predictors of the new neural network model and its activation as the target of the new neural network model. The penalty term described earlier is applied to ensure that the resultant new neural network model simulating the activation of the complex node is simple and sparse in its architecture. FIG. 6(*a*) shows the input variables and the complex hidden node corresponding to the simplified neural network in FIG. 4. FIG. 6(*b*) shows the new simplified neural network to represent the complex hidden node from FIG. 4.

In each iteration, a simplified neural network is trained to represent each complex hidden node in this fashion. This continues to be done iteratively until no hidden node with input variables remain complex. Recall that a complex hidden node is defined as a hidden node which has more than N input variables.

Notation

A unique notation can be used for annotating the hidden nodes thus identified. This begins with a single hidden layer. In that layer, j is the identifier for hidden node. So $h_3$ means hidden node 3. When this node is exploded and yields two hidden nodes, they are then annotated as $h_{31}$ and $h_{32}$ respectively. Thus, $h_{j1}$ implies $1^{st}$ hidden node when exploding the original $j^{th}$ hidden node. This nomenclature is iteratively applied every time a hidden node is exploded. The convention of $w_{ij}$ representing connection between $i^{th}$ input node and $j^{th}$ hidden node still holds. It is just that j now follows an iterative naming convention.

Interpretable Neural Network Model

Figure 7:
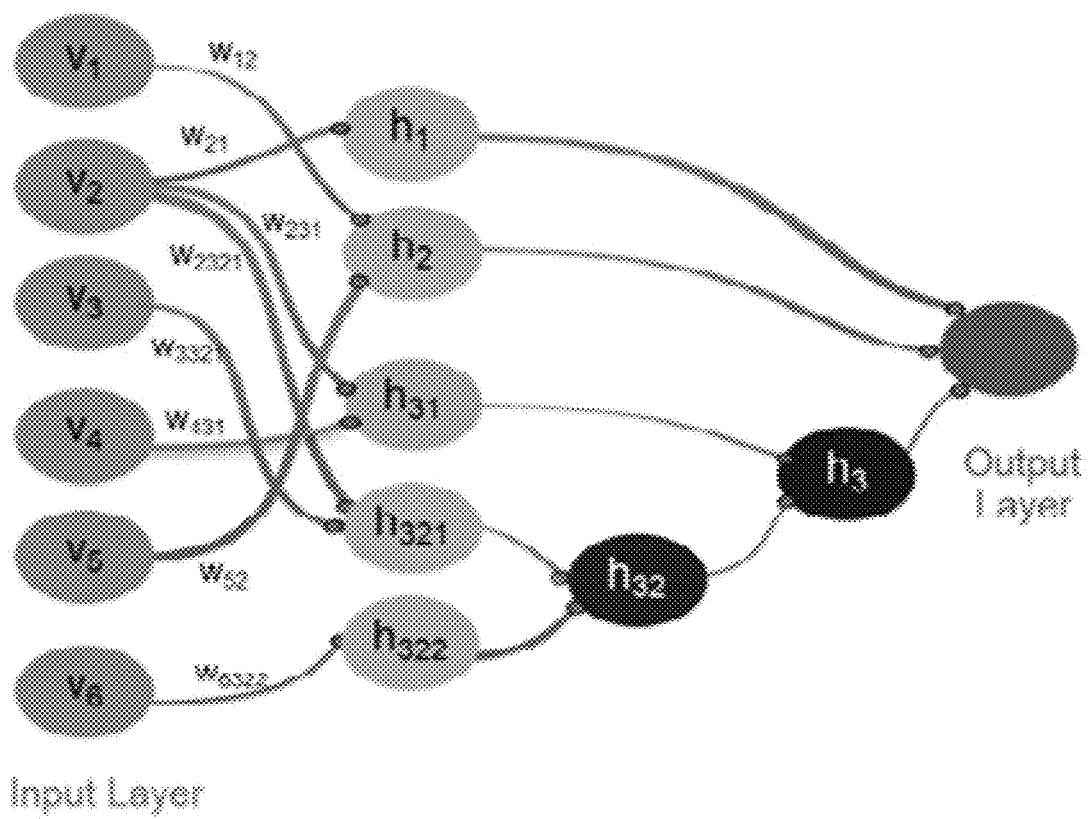
FIG. 7. is a schematic representation of an interpretable neural network model corresponding to the example in FIG. 2.

Iterative application of the methodology described earlier yields a neural network model in which no hidden node connected to the input layer remains complex. FIG. 7. is a schematic representation of such an interpretable neural network model corresponding to the example in FIG. 2. Each hidden node has up to N interpretability inputs. In this example, N=2. The node nomenclature follows the scheme defined in the previous section. The weights nomenclature incorporates the nomenclature for hidden nodes. Note that, as per convention, the bias terms are not shown but they are assumed to exist. Accordingly, in FIG. 7, the hidden node $h_3$ from first iteration was exploded into $h_{31}$ and $h_{32}$, where $h_{31}$ met the interpretability threshold of N=2. Hidden node $h_{32}$ from the second iteration is a complex node, which is exploded into $h_{321}$ and $h_{322}$, both of which meet the interpretability threshold. The weight $w_{6322}$ is then the weight of the edge that connects input variable $v_6$ to the hidden node $h_{322}$. For the sake of completeness, the bias term for $h_{322}$ is referred to as $w_{0322}$.

Extracting Interpretable Latent Features

Once an interpretable neural network is available, it becomes straightforward to extract interpretable latent features. Each hidden node connected to the input layer represents an interpretable latent feature and can be represented as a non-linear transform of weighted sum of up to N input variables. In the FIG. 7, five interpretable latent features are shown. For the sake of completeness and to act as a guide, the listing of all the interpretable latent factors is shown in FIG. 8.

FIG. 8 illustrates a representation of interpretable latent features based on the example in FIG. 7, where σ is the activation function and in this example the activation function is a sigmoidal function. The nomenclature scheme defined above is followed, as noted by the bias terms, $w_{0j}$.

Handling Variation in Data

Fully connected neural networks can capture subtle relationships between data points specific to even micro segments of the data. As the model's architecture is simplified, the simplicity can compromise this ability of subtle distinction. Hence, the methodology can be applied to segmented sub populations. This section describes a mechanism to learn the segments using the neural network.

A fully connected neural network model, as shown and exemplified in FIG. 2, can be leveraged as a reference model for identifying the segments that are relevant to retain the model's performance. This reference model is what is trained in the first step outlined above. Then, all the records in the training dataset are processed through the reference model. As they are processed, the activations of all the hidden nodes are recorded.

Figure 9:
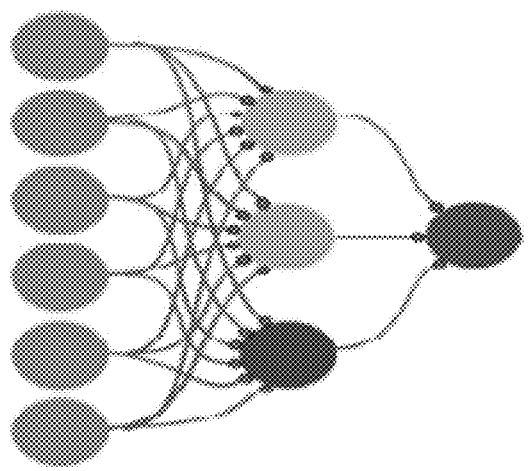
FIG. 9 illustrates that different hidden nodes will have different activation for different input records.
Figure 9:
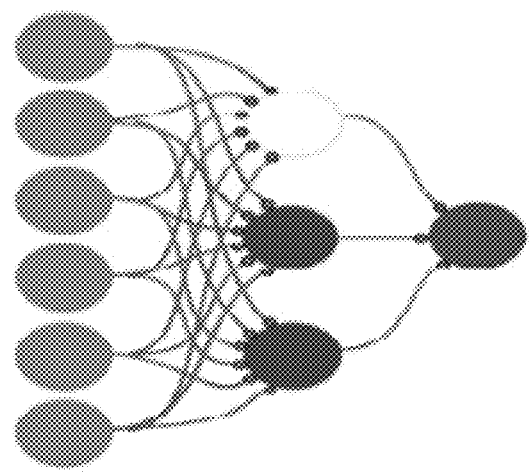

FIG. 9 shows the schematic representation of different activations for hidden nodes corresponding to different records, to illustrate that different hidden nodes will have different activation for different input records. Shaded sections represent the strength of activation in this schematic example. These two records lie far from each other in the latent space represented by the hidden nodes. Note that for record j, one node does not activate. When this is done for all the records in the dataset, it yields an activation matrix as shown in FIG. 10.

Figure 10:
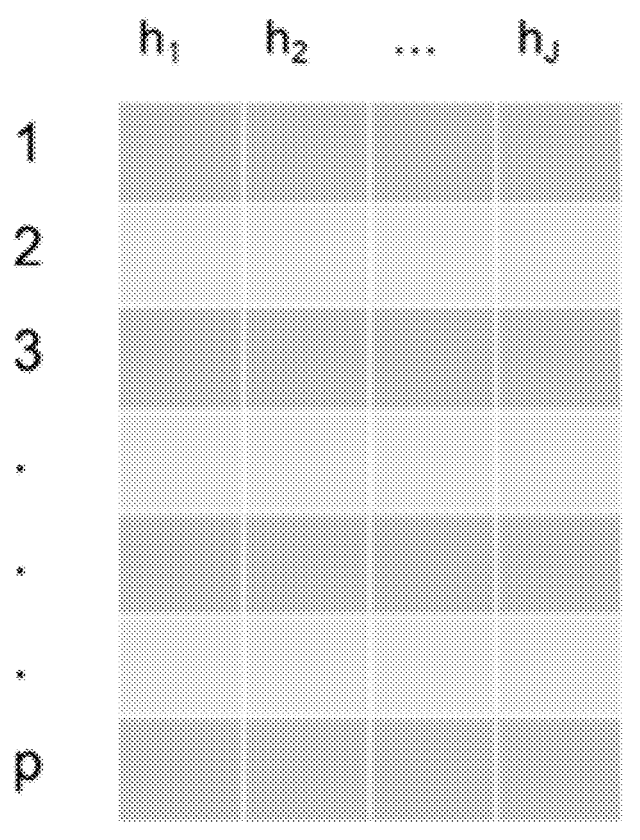

FIG. 10 is an activation matrix corresponding to processing p records through the reference neural network model with J hidden nodes. Correlation between the activations across all nodes is sought to determine the natural grouping of records which yield similar activations. One mechanism to do so is through computing a correlation matrix between the records based on the activations of the hidden nodes. This correlation matrix acts as a distance matrix between data points indicating how similar or dissimilar their corresponding activations are. The distance matrix is then utilized to find the groupings of similar records, yielding a few segments of population. Each segment has similar set of nodes that are active and inactive. Another approach is to utilize Karhunen-Loeve Decompositions which reduce the complexity to a finite number eigen functions, and allows for compression where the energy of the correlation between input feature activations and eigen functions to determine dominant common groupings. One can also define a Karhunen-Loeve dimension of the matrix that will provide a sense of the dimensionality of segments and importance of each principle component of hidden nodes in the data.

Figure 11:
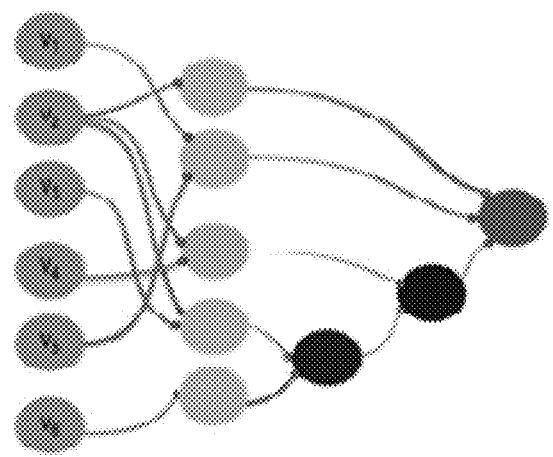
FIG. 11 shows a schematic of two simplified neural networks with an interpretable architecture for two different population segments.
Figure 11:
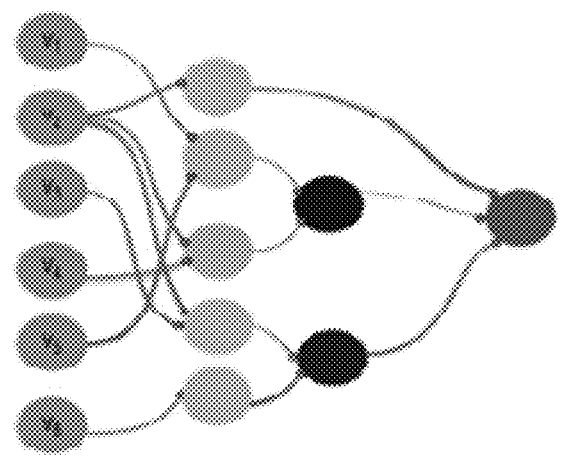

While using segments, there is no change in the methodology, except that the model is trained using segmented data. The difference arises in the final set of simplified neural network models. Depending on the segment, the nature of interpretable latent factors could vary and could further simplify explanation of variation in the data. In fact, the hidden nodes may differ in terms of the constituent input variables, and/or their weights. FIG. 11 shows a schematic representation of such a set of simplified neural networks with interpretable architecture.

FIG. 11 is a schematic of simplified neural networks with interpretable architecture for two different population segments. The hidden nodes of the two models differ in terms of the constituent input variables and their weights. The two schematic records from FIG. 9 correspond to these two segments, respectively. Note that the interpretability threshold, N=2 in this schematic example.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method, executed by one or more computer processors, of extracting explainable latent features from a machine learning model using a training dataset, the machine learning model having one or more predictive input variables, each of the one or more predictive input variables having a weight in the machine learning model, the method comprising:
training a fully connected neural network model with the one or more predictive input variables using a training data set, the neural network model having an input layer, an output layer, and one or more hidden layers each comprising one or more hidden nodes, each hidden node having one or more inputs and at least one output;
applying regularization to a cost function of the neural network model such that weights of one or more edges connecting the predictive input variables to the hidden nodes converge towards zero;
extracting from the neural network model any hidden node that has up to N non-zero inputs, where N is a threshold for human explanation of the relationship between the N non-zero inputs to the hidden node; and
for hidden nodes with greater than N non-zero inputs, generating a separate neural network to model each node's activation from the trained neural network model response on the training dataset to expose the explainable latent features of the hidden nodes via new hidden nodes of less complexity of the separate neural network,
the resulting neural network with all hidden nodes at complexity of N non-zero inputs or less being an explainable latent feature neural network.

2. The method in accordance with claim 1, further comprising, for each hidden node modeled by a separate neural network, training the separate neural network using the dataset generated by the hidden node output based on the one or more predictive input variables and the training dataset.

3. The method in accordance with claim 2, further comprising applying regularization to the cost function of the separate neural network such that weights of the one or more edges connecting the predictive input variables to the new hidden nodes converge towards zero.

4. The method in accordance with claim 3, further comprising extracting from the separate neural network any new hidden node that has up to N non-zero inputs, where N is the threshold for human explainability of the relationship between inputs to the hidden node explaining the hidden node output.

5. The method in accordance with claim 4, further comprising for new hidden nodes with greater than N non-zero inputs, generating a new separate neural network to model each node's activation from the trained neural network model and the response on the training data set to expose the explainable latent features of the hidden nodes via new hidden nodes of the new separate neural network.

6. A computer program product for extracting explainable latent features from a training dataset of a machine learning model, the training dataset having one or more predictive input variables, each of the one or more predictive input variables having a weight, the computer program product comprising a non-transitory machine-readable medium storing instructions that, when executed by at least one programmable processor, cause the at least one programmable processor to perform operations comprising:
train a fully connected neural network model with the one or more predictive input variables using a training data set, the neural network model having an input layer, an output layer, and one or more hidden layers each comprising one or more hidden nodes, each hidden node having one or more inputs and at least one output;
apply regularization to a cost function of the neural network model such that weights of one or more edges connecting the predictive input variables to the hidden nodes converge towards zero;
extract from the neural network model any hidden node that has up to N non-zero inputs, where N is a threshold for human explanation of the relationship between the N non-zero inputs to the hidden node; and
for hidden nodes with greater than N non-zero inputs, generate a separate neural network to model each node's activation from the trained neural network model response on the training dataset to expose the explainable latent features of the hidden nodes via new hidden nodes of less complexity of the separate neural network,
the resulting neural network with all hidden nodes at complexity of N non-zero inputs or less being an explainable latent feature neural network.

7. The computer program product in accordance with claim 6, wherein the instructions cause the at least one programmable processor to perform operations further comprising, for each hidden node modeled by a separate neural network, train the separate neural network using the dataset generated by the hidden node output based on the one or more predictive input variables and the training dataset.

8. The computer program product in accordance with claim 7, wherein the instructions cause the at least one programmable processor to perform operations further comprising apply regularization to the cost function of the separate neural network such that weights of the one or more edges connecting the predictive input variables to the new hidden nodes converge towards zero.

9. The computer program product in accordance with claim 8, wherein the instructions cause the at least one programmable processor to perform operations further comprising extract from the separate neural network any new hidden node that has up to N non-zero inputs, where N is the threshold for human explainability of the relationship between inputs to the hidden node explaining the hidden node output.

10. The computer program product in accordance with claim 9, wherein the instructions cause the at least one programmable processor to perform operations further comprising, for new hidden nodes with greater than N non-zero inputs, generate a new separate neural network to model each node's activation from the trained neural network model and the response on the training data set to expose the explainable latent features of the hidden nodes via new hidden nodes of the new separate neural network.

11. A system for extracting explainable latent features from a training dataset of a machine learning model, the training dataset having one or more predictive input variables, each of the one or more predictive input variables having a weight, the system comprising:
at least one programmable processor; and
a non-transitory machine-readable medium storing instructions that, when executed by at least one programmable processor, cause the at least one programmable processor to perform operations comprising:
train a fully connected neural network model with the one or more predictive input variables using a training data set, the neural network model having an input layer, an output layer, and one or more hidden layers each comprising one or more hidden nodes, each hidden node having one or more inputs and at least one output;

apply regularization to a cost function of the neural network model such that weights of one or more edges connecting the predictive input variables to the hidden nodes converge towards zero;

extract from the neural network model any hidden node that has up to N non-zero inputs, where N is a threshold for human explanation of the relationship between the N non-zero inputs to the hidden node; and for hidden nodes with greater than N non-zero inputs, generate a separate neural network to model each node's activation from the trained neural network model response on the training dataset to expose the explainable latent features of the hidden nodes via new hidden nodes of less complexity of the separate neural network, the resulting neural network with all hidden nodes at complexity of N non-zero inputs or less being an explainable latent feature neural network.

12. The system in accordance with claim 11, wherein the instructions cause the at least one programmable processor to perform operations further comprising, for each hidden node modeled by a separate neural network, train the separate neural network using the dataset generated by the hidden node output based on the one or more predictive input variables and the training dataset.

13. The system in accordance with claim 12, wherein the instructions cause the at least one programmable processor to perform operations further comprising apply regularization to the cost function of the separate neural network such that weights of the one or more edges connecting the predictive input variables to the new hidden nodes converge towards zero.

14. The system in accordance with claim 13, wherein the instructions cause the at least one programmable processor to perform operations further comprising extract from the separate neural network any new hidden node that has up to N non-zero inputs, where N is the threshold for human explainability of the relationship between inputs to the hidden node explaining the hidden node output.

15. The system in accordance with claim 14, wherein the instructions cause the at least one programmable processor to perform operations further comprising, for new hidden nodes with greater than N non-zero inputs, generate a new separate neural network to model each node's activation from the trained neural network model and the response on the training data set to expose the explainable latent features of the hidden nodes via new hidden nodes of the new separate neural network.

* * * * *